Figure 7:
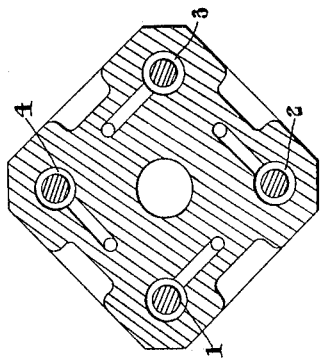

G. CONSTANTINESCU.
METHOD AND MEANS FOR OBTAINING GASEOUS FUEL.
APPLICATION FILED FEB. 26, 1913.

1,120,135.

Patented Dec. 8, 1914.
5 SHEETS—SHEET 1.

WITNESSES
Teresa V. Lynch
Rita Lynch

INVENTOR
Gogu Constantinesco
BY
ATTORNEY

G. CONSTANTINESCU.
METHOD AND MEANS FOR OBTAINING GASEOUS FUEL.
APPLICATION FILED FEB. 26, 1913.
1,120,135.
Patented Dec. 8, 1914.
5 SHEETS—SHEET 2.
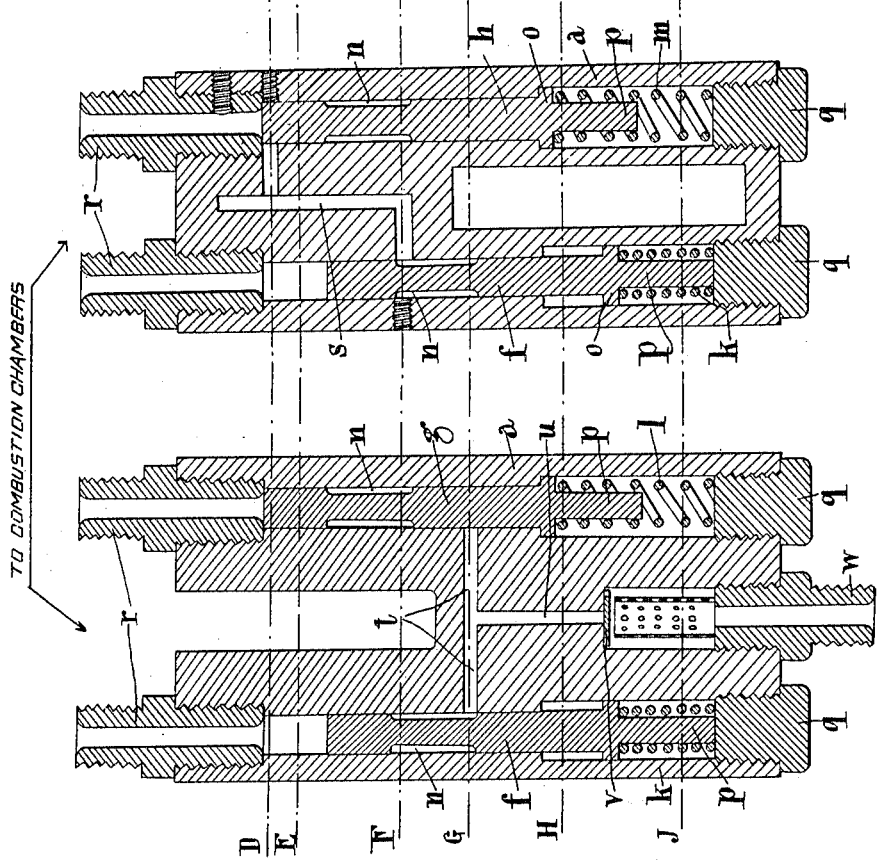

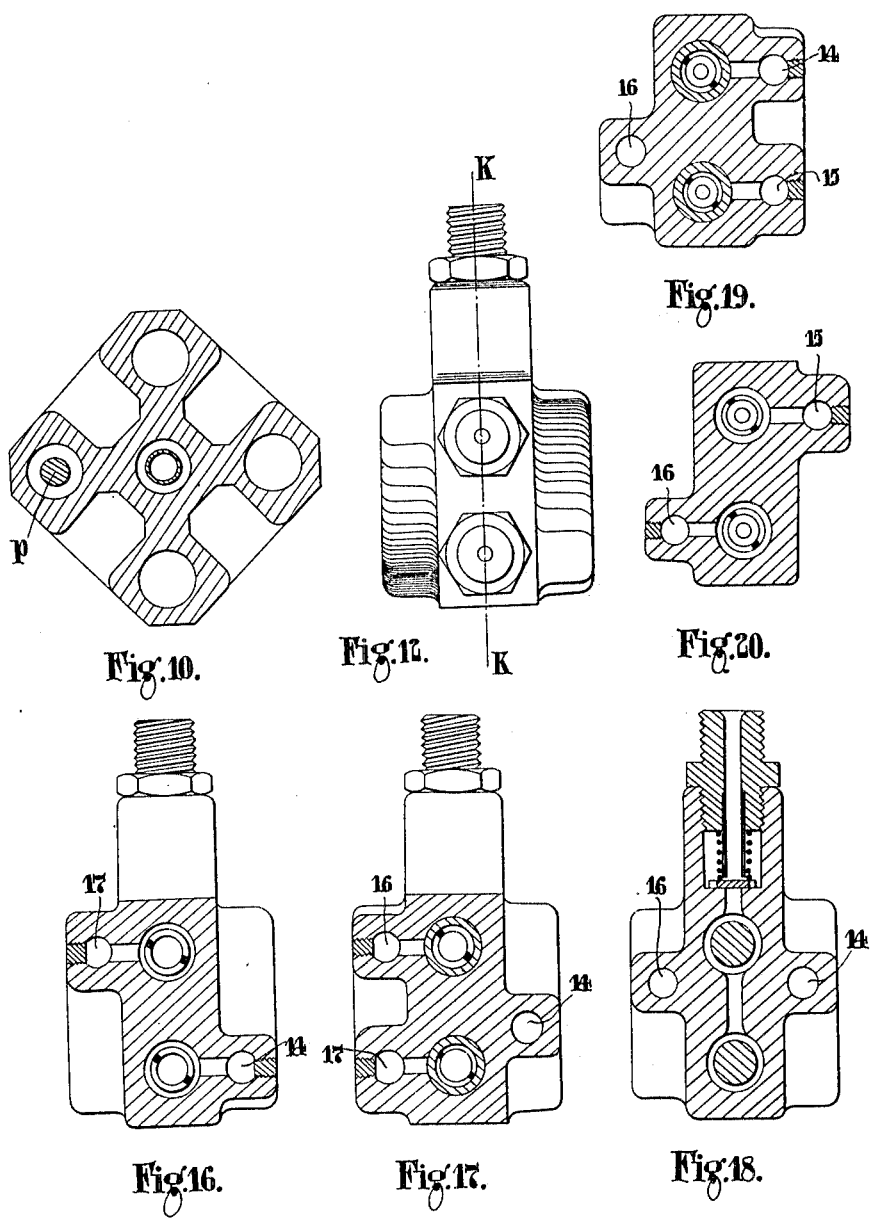

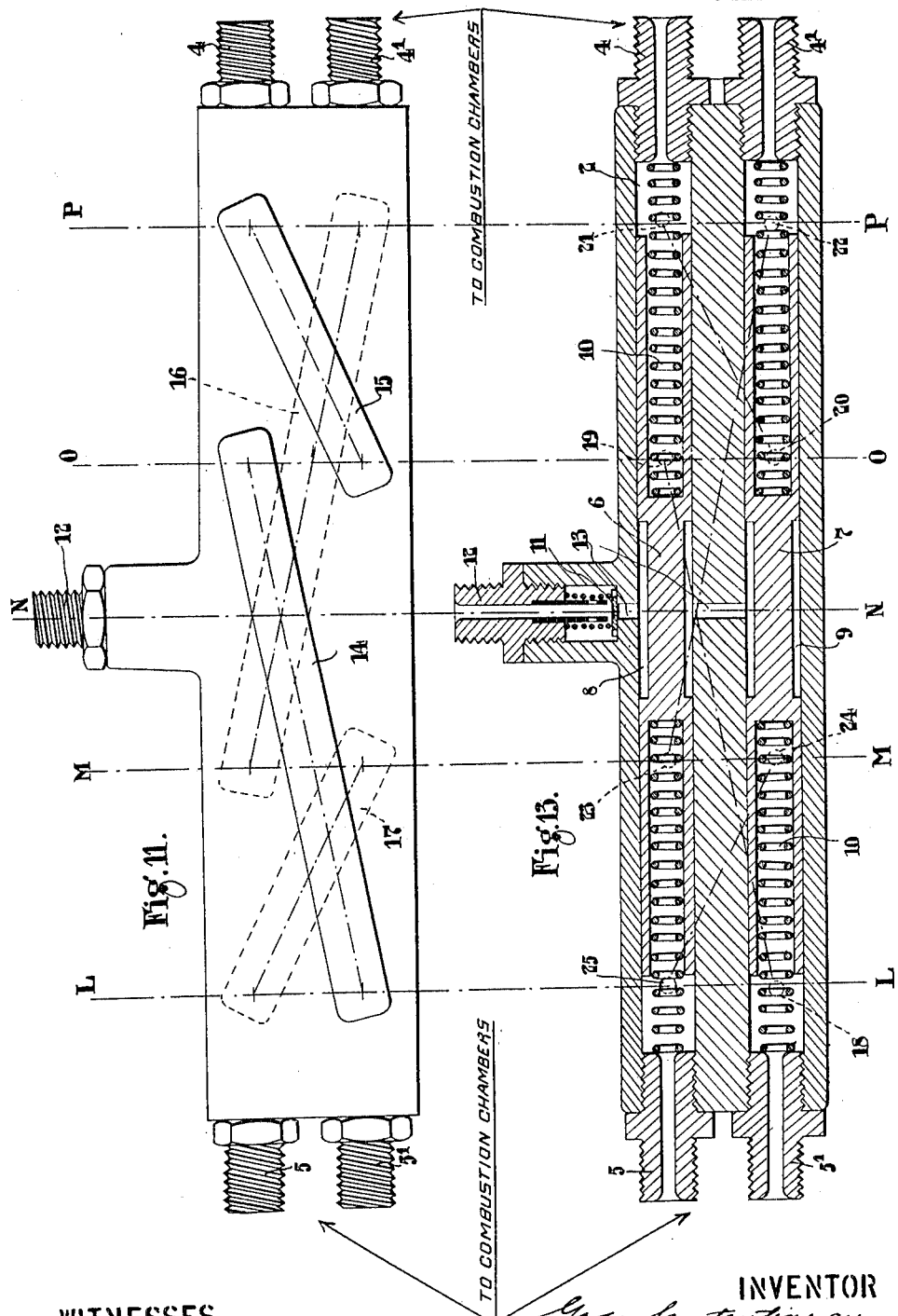

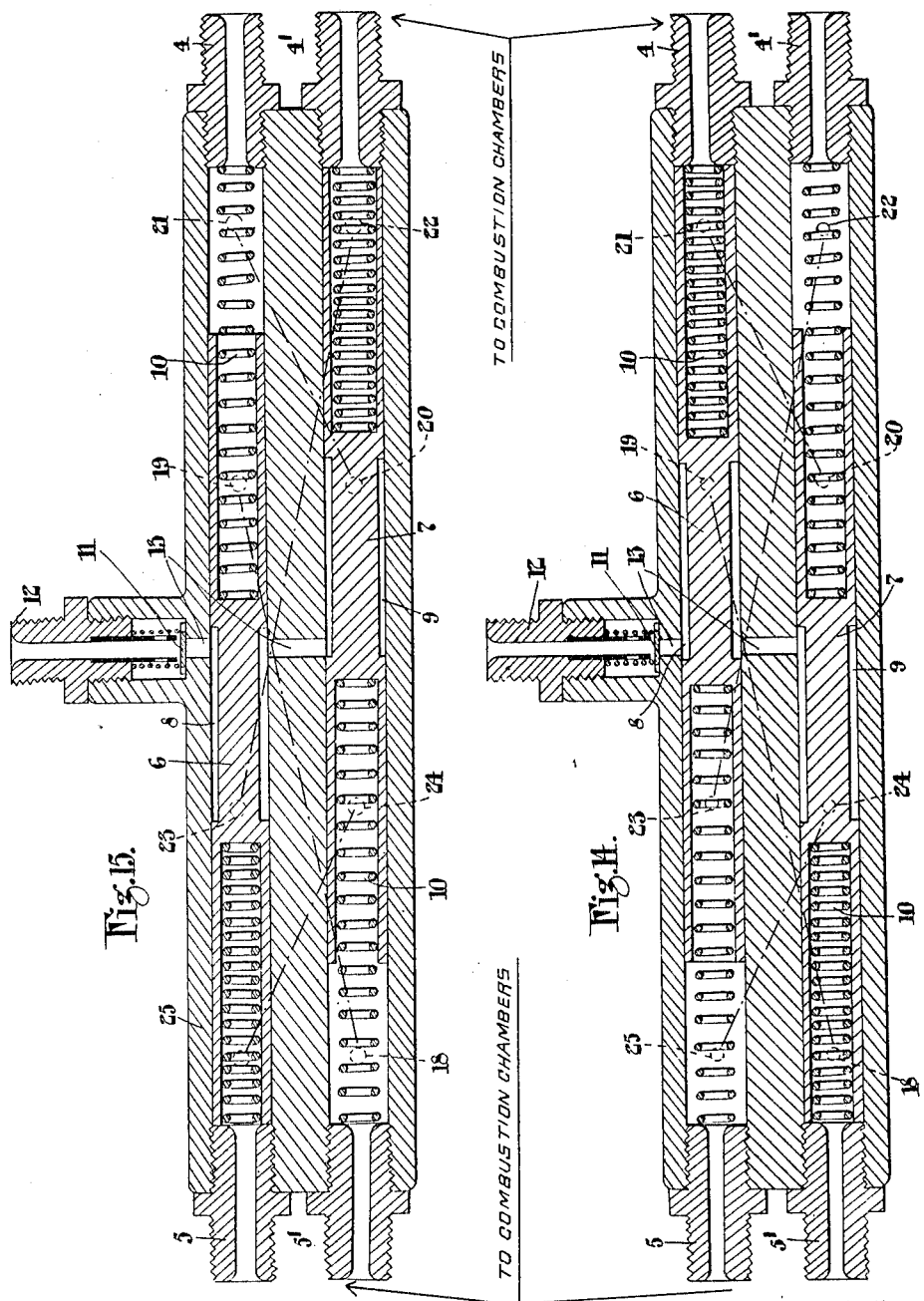

UNITED STATES PATENT OFFICE.

GOGU CONSTANTINESCU, OF BLOOMSBURY, LONDON, ENGLAND.

METHOD AND MEANS FOR OBTAINING GASEOUS FUEL.

1,120,135. Specification of Letters Patent. Patented Dec. 8, 1914.

Application filed February 26, 1913. Serial No. 750,717.

*To all whom it may concern:*

Be it known that I, GOGU CONSTANTINESCU, a subject of the King of Roumania, and residing at 11 Hart street, Bloomsbury, London, W. C., England, have invented a certain new and useful Improved Method and Means for Obtaining Gaseous Fuel, of which the following is a specification.

This invention relates to a method and means for obtaining a supply of gaseous fuel, and has for its object to collect and store or utilize a certain portion of the combustible mixture supplied to an internal combustion engine and to use such portion for the purpose of lighting or heating.

The invention broadly consists in utilizing the force of the explosions in the cylinders of the internal combustion engine for operating a distributer to allow the passage of a portion of the combustible mixture contained in the several cylinders during the periods of compression.

The invention further consists in apparatus for utilizing the force of the explosions in the cylinders of the motor for the purpose of operating valves in a distributer controlling passages leading from the combustion chambers of the engine containing combustible mixture to a storing device or devices for utilizing the fuel.

The invention further consists in a distributer having a number of small pistons equal in number to the cylinders of the motor, the pistons working in small cylinders in communication with the respective explosion chambers of the motor and operating as distributing valves, suitable ports being provided for this purpose, the ports and valves being so arranged that at each explosion in a cylinder of the motor one of the small pistons is displaced in such a manner as to establish communication between a reservoir or utilizing devices and one of the motor cylinders which at this moment contains compressed combustible mixture.

The invention also consists in a distributer formed of a single block perforated with cylindrical holes in which small pistons are provided forced in one direction by the pressure of explosions in the cylinders of the engines and in the other direction by springs, the pistons being provided with constricted portions coöperating with ports to place a storage reservoir or devices for utilizing the fuel in combination with that one of the cylinders of the engine which at the moment contains combustible mixture.

The invention further consists in the improved method and means for obtaining a supply of combustible mixture from an internal combustion engine hereinafter described.

Figure 9:
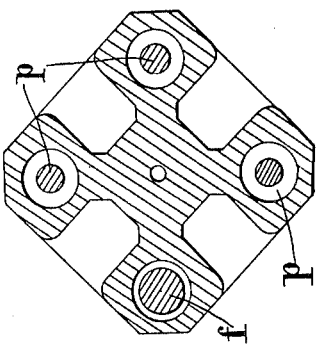
Figure 6:
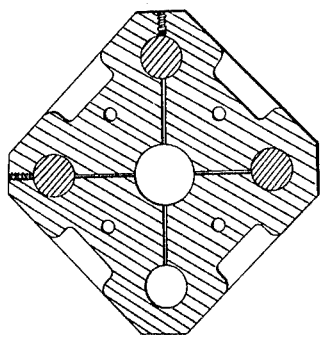
Figure 8:
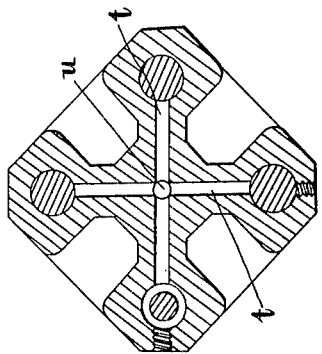
Figure 1:
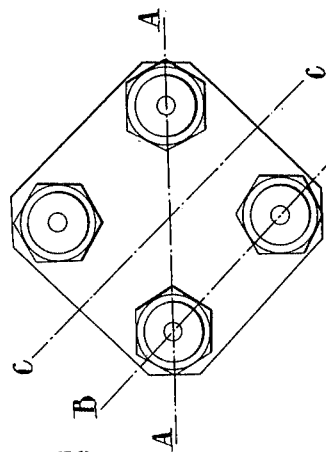
Figure 5:
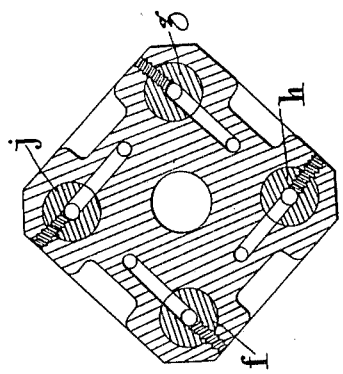

Referring to the accompanying drawings, Figure 1 is a plan view of an apparatus embodying the present invention; Fig. 2 is a cross sectional elevation on the line A—A of Fig. 1; Fig. 3 is a cross sectional elevation on the line B—B of Fig. 1; Fig. 4 is a cross sectional elevation on the line C—C of Fig. 1; Fig. 5 is a cross sectional plan on the line D—D of Figs. 2, 3 and 4; Fig. 6 is a cross sectional plan on the line E—E of Figs. 2, 3 and 4; Fig. 7 is a cross sectional plan on the line F—F of Figs. 2, 3 and 4; Fig. 8 is a cross sectional plan on the line G—G of Figs. 2, 3 and 4. Fig. 9 is a cross sectional plan on the line H—H of Figs. 2, 3 and 4; Fig. 10 is a cross sectional plan on the line J—J of Figs. 2, 3 and 4; Fig. 11 is a side elevation of a modification of the present invention; Fig. 12 is an end view of Fig. 11; Fig. 13 is a sectional elevation on the line K—K of Fig. 12 showing one position of the pistons; Fig. 14 is a further sectional elevation on the line K—K with the pistons in a different position; Fig. 15 is a further sectional elevation on the line K—K with the pistons in the opposite position to that of Fig. 14; Fig. 16 is a cross sectional end view on the line L—L of Figs. 11 and 13; Fig. 17 is a cross sectional end view on the line M—M of Figs. 11 and 13; Fig. 18 is a cross sectional end view on the line N—N of Figs. 11 and 13; Fig. 19 is a cross sectional view on the line O—O of Figs. 11 and 13; Fig. 20 is a cross sectional view on the line P—P of Figs. 11 and 13.

In carrying the invention into effect according to one example, as applied to a four-cylinder internal combustion engine, a block $a$ is provided in which four cylinders 1, 2, 3 and 4 are bored containing four distributing pistons, $f$, $g$, $h$, $j$. The four cylinders are larger at their lower ends so as to receive springs $k$, $l$, $m$ sufficiently powerful to return the pistons to their upper position after each stroke. The pistons are for a certain length as at $n$ reduced in diameter so as to leave a clear space between this portion of the pistons and the side of the cylinder. Toward the other end of the piston is a ring or shoulder $o$ fixed to the piston which is adapted to bear against a spring so as to force the piston in the upward direction, the downward movement of the piston being limited by its end $p$ striking against a plug $q$ at the bottom of the cylinder. The upper parts of the cylinders end in nipples which are connected by pipes to the respective cylinders of the motor. The annular space $n$ around each piston communicates permanently with the upper part of the adjacent cylinder by means of a suitable passage $s$ formed by a lateral perforation through the block, which is afterward plugged up by the screws, nuts or other suitable means, these screws or nuts providing for inspection and cleaning of the passages. At the lower level the cylinders are all in communication through radial ducts $t$ with a central duct $u$ which is usually closed by a check valve $v$. This valve allows the gas passing through the ducts to pass freely, and a pipe connects a nipple $w$ on the lower side of this check valve with the reservoir or with the lamps or other devices in which the fuel taken from the engine cylinders is to be utilized. The central upper portion of the block in which the cylinders are bored may, if desired, be hollowed out and water-cooled to obtain more rapid cooling.

The operation of the apparatus is as follows:—Supposing the numbers 1, 2, 3, 4 indicate the various cylinders of the distributer which correspond to the similarly numbered cylinders of the motor ignited successively at the moment when ignition occurs in motor cylinder No. 1, the explosion pressure is transmitted to the upper end of the piston $f$ in distributer cylinder No. 1, and this piston assumes the lowest position, see Fig. 2. In this position the upper annular space $n$ around the piston is in communication with the ducts $t$ leading from the distributer to the store or utilizing devices. At the same moment the compression stroke is going on in cylinder No. 2 of the engine, so that the compressed gases are forced through the top of cylinder No. 2 down the central duct $s$ and around the annular space $n$ of piston $f$, through the check valve $v$ and to the passage leading to the store. As soon as the period of expansion is terminated in cylinder No. 1 of the engine, the spring $k$ drives the piston $f$ of No. 1 distributer to its upper position and thereby interrupts communication between the passage $t$ leading to the store and the annular space $n$. During the following stroke ignition occurs in cylinder No. 2 of the engine and in a similar manner to that above described cylinder No. 3 of the engine is placed in communication with the store through the annular space $n$ around the piston $h$ of distributer No. 2. In a similar manner the pressure of explosion in each cylinder opens communication between the cylinder in which compression is then occurring and the store or gas utilizing devices.

A modified form of the invention is shown in Figs. 11 to 20. In this modification the apparatus takes the form of an oblong body preferably of cast metal having two cylindrical passages 2, 3 bored in it, these passages being closed at their ends by drilled nipples 4, 4' and 5, 5'. Within these cylindrical borings double-ended pistons 6 and 7 are adapted to reciprocate. The pistons have reduced portions 8 and 9, and their ends are bored up to form cavities to contain springs 10. The tension of these springs is arranged so that the normal position of the pistons is that shown in Fig. 13. A non-return valve 11 is provided in which a connection 12, leads to the reservoir or devices for using the fluid coming from the apparatus. A cross passage 13 connects the space around the reduced portions of the pistons with the outlet valve 11. Upon the side of the body projections are provided which are bored up to provide passages 14, 15, 16 and 17. The passage 14 connects an aperture 18 in the cylinder 3 with an aperture 19 in the cylinder 2. The passage 15 connects an aperture 20 in cylinder 3 and an aperture 21 in cylinder 2. The passage 16 connects an aperture 22 in cylinder 3 and an aperture 23 in cylinder 2, while the passage 17 connects an aperture 24 in cylinder 3 to an aperture 25 in cylinder 2. The nipples 4, 4', 5, 5' are connected by suitable pipes or passages with the cylinders 1, 2, 3 and 4 respectively of a four-cylinder engine.

The action of the apparatus is as follows:—Assuming an explosion to have taken place in cylinder 2 of the engine, this forces the piston 7 to the left as shown in Fig. 14, thereby establishing communication between the aperture 24 and the outlet valve 11. At the same time compression is going on in the cylinder 3 of the engine, which drives the piston 6 to the right, thus disclosing the aperture 25 and giving free passage to a portion of the charge undergoing compression through aperture 25, passage 17, aperture 24, passage 13, to the valve 11.

In Fig. 15, the position of the pistons is shown when the next cylinder, viz. the fourth, is firing. The explosion pressure drives the piston 7 to the right, disclosing the aperture 20. At the same time piston 6 is driven to the left, disclosing the aperture 21. Communication is thus established between cylinder 1 to the engine in which compression is being effected and outlet 12. This series of operations is repeated continuously so long as the engine continues to run and so long as communication is allowed between the distributing device and the engine cylinders. It will be seen that the result of this method of operation is that at each stroke of the piston of the engine a portion of the compressed gas passes through the distributer to the reservoir or to means for utilizing the gas.

The invention is applicable to all kinds of internal combustion engines, especially to petrol engines, and it is found that the gas so obtained from motors in motor cars is of such a quality that it can be employed for lighting by means of incandescent burners either directly or by passing it through petrol, benzol, naphthalene or other fuel.

The gas produced according to the invention is a perfectly carbureted air compressed to a pressure which can be regulated by any suitable device. For example, in the case of burners for incandescent mantels, it is sufficient to provide a rubber bag for storing the gas, as in the case of acetylene burners. As the pressures produced in the apparatus are considerable, the pipes leading to the motor cylinders may be of small diameter provided they are sufficient to supply the desired volume of gas. For lighting lamps in a motor car having a four-cylinder engine, it is sufficient that the pipes should have an internal diameter of 2 mm.

It will be readily seen that the invention is applicable to motors with any number of cylinders provided the timing is such that the period of explosion in one cylinder corresponds with the period of compression in another.

Having now described my invention, what I claim as new and desire to secure by Letters Patent is:—

1. A device for drawing off mixture from the combustion chambers of multi-cylinder internal combustion engines, comprising a plurality of plungers working in small cylinders, reduced portions on said plungers, ports in said cylinders, adapted to be overrun by said reduced portions, a conduit leading from each of said ports to a storage receptacle, and a conduit leading from the end of each of said little cylinders to a combustion chamber of the engine.

2. A device for drawing off mixture from the combustion chambers of multi-cylinder internal combustion engines, comprising a plurality of plungers working in small cylinders, reduced portions on said plungers, ports in said cylinders adapted to be overrun by said reduced portions, ports in said cylinders adapted to be overrun by the heads of said plungers, a conduit leading from each of said ports to a storage receptacle, a conduit leading from the end of each of said little chambers to a combustion chamber of the engine, and conduits connecting a recess controlled port of one cylinder with a head controlled port of another cylinder.

3. A device for drawing off mixture from the combustion chambers of a four cylinder internal combustion engine, comprising a block having two parallel bores therein, a plunger in each of said bores, a reduced portion at about the middle of each of said plungers, a conduit leading from each of said bores to a combustion chamber of the engine, a common port overrun by each of said reduced portions, and communicating with a storage reservoir, two additional ports in each bore overrun by said reduced portions, a port near each end of said bores overrun by the ends of said plungers, these latter ports being each connected with one of said additional ports.

4. An apparatus for drawing off mixture from the combustion chambers of multi-cylinder internal combustion engines, comprising a distributer formed of a single block perforated with cylindrical holes in which double-ended pistons operate forced in one direction by the pressure of explosions or compressions in the cylinders of an internal combustion engine and in the other direction by springs, the pistons being provided with constricted portions coöperating with ports to place a storage reservoir or device for utilizing the fluid in communication with that one of the cylinders of the engine which at the moment contains combustible mixture.

5. An apparatus for drawing off mixture from the combustion chambers of multi-cylinder internal combustion engines, comprising a number of small pistons working in small cylinders each in communication with an explosion chamber of the engine and adapted to operate as distributing valves, suitable ports being provided for this purpose, the ports and valves being so arranged that at each explosion in the cylinder of the motor one of the small pistons is displaced in such a manner as to establish communication between the reservoir and one of the motor cylinders which at this moment contains compressed combustible mixture.

6. An apparatus for drawing off mixture from the combustion chambers of multi-cylinder internal combustion engines, comprising a number of double-ended pistons working in small cylinders in communication with the respective explosion chambers of an internal combustion engine and operating as distributing valves suitable ports being provided for this purpose the ports and valves being so arranged that at each explosion in the cylinders of the motor one of the small double-ended pistons is displaced in such a manner as to establish communication between the reservoir or utilizing devices and one of the motor cylinders which at this moment contains compressed combustible mixture.

In testimony whereof I have signed my name to this specification in the presence of two subscribing witnesses.

GOGU CONSTANTINESCU.

Witnesses:
BERTRAM H. MATTHEWS,
WALTER I. S. WERTON.